United States Patent [19]

Tamai et al.

[11] Patent Number: 4,795,798

[45] Date of Patent: Jan. 3, 1989

[54] HIGH-TEMPERATURE ADHESIVE POLYIMIDE FROM 2,2-BIS[4-(3-AMINO PHENOXY)PHENYL]1,1,1,3,3,3-HEXA-FLUORO PROPANE

[75] Inventors: Shoji Tamai, Yokohama; Saburo Kawashima, Yokosuka; Masahiro Ohta; Hideaki Oikawa, both of Yokohama; Kouji Ohkoshi, Zushi; Akihiro Yamaguchi, Kamakura, all of Japan

[73] Assignee: Mitsui Toatsu Chemicals, Inc., Tokyo, Japan

[21] Appl. No.: 18,496

[22] Filed: Feb. 25, 1987

[30] Foreign Application Priority Data

Feb. 25, 1986 [JP] Japan .................... 61-038390
Apr. 15, 1986 [JP] Japan .................... 61-084945

[51] Int. Cl.$^4$ .................................. C08G 73/10
[52] U.S. Cl. .................................. 528/185; 528/125; 528/128; 528/183; 528/187
[58] Field of Search ............ 528/185, 187, 183, 125, 528/128, 353

[56] References Cited

U.S. PATENT DOCUMENTS

| | | | |
|---|---|---|---|
| 3,716,549 | 2/1973 | Darsow et al. | 260/297 R |
| 4,111,906 | 9/1978 | Jones et al. | 528/229 |
| 4,203,922 | 5/1980 | Jones et al. | 564/315 |
| 4,535,101 | 8/1985 | Lee et al. | 528/185 |

FOREIGN PATENT DOCUMENTS

| | | |
|---|---|---|
| 58-157190 | 9/1983 | Japan . |
| 59-76451 | 5/1984 | Japan . |
| 267893 | 7/1970 | U.S.S.R. . |

*Primary Examiner*—Harold D. Anderson
*Attorney, Agent, or Firm*—Fisher, Christen & Sabol

[57] ABSTRACT

This invention discloses high-temperature adhesives having a good light-transmittance and excellent high-temperature flowability which comprises polyimide having recurring units represented by the following formula (I)

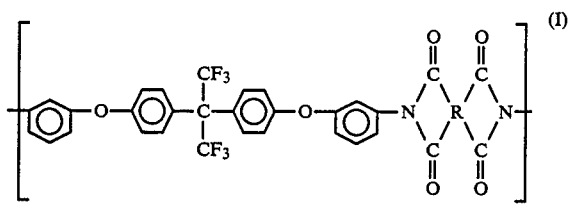

(where R is a tetra-valent radical selected from the group consisting of aliphatic radical having not less than two carbons, cyclo-aliphatic radical, monoaromatic radical, condensed polyaromatic radical, and non condensed polyaromatic radical wherein aromatic radicals are mutually connected with a bond or a crosslinking function).

The polyimide is obtained by preparing polyamic acid through the reaction of 2,2-bis[4-(3-aminophenoxy)-phenyl]-1,1,1,3,3,3,-hexafluoropropane as a diamine component with tetracarboxylic dianhydride such as pyromellitic dianhydride, 3,3',4,4'- biphenyltetracarboxylic dianhydride, bis(3,4-dicarboxyphenyl) ether dianhydride and 3,3'4,4'-benzophenonetetracarboxylic dianhydride, and further conducting the ring-closing reaction of resultant polyamic acid by dehydration.

5 Claims, 1 Drawing Sheet

HIGH-TEMPERATURE ADHESIVE POLYIMIDE FROM 2,2-BIS[4-(3-AMINO PHENOXY)PHENYL]1,1,1,3,3,3-HEXAFLUORO PROPANE

BACKGROUND OF THE INVENTION

This invention relates to high-temperature adhesives and particularly to adhesives having excellent adhesive strength and high-temperature stability.

Polymide obtained by the reaction of tetracarboxylic dianhydride with diamine have known up to this time to have various outstanding properties and good high-temperature stability. Therefore polyimide is expected to develop a wide application in those fields which require stability at high temperatures.

A variety of polyimide has recently been developed and found a use also as adhesives. For example, in TOKKAISHO 58-157190 (1983), polymide derived from various diamines and tetracarboxylic dianhydrides is disclosed to have application to adhesive between a polyimide film and a copper foil in a flexible copper-clad circuit substrate.

Although polyimide adhesive is excellent in the high-temperature stability and adhesive strength, it is further required to be good in high-temperature flowability and easy to process at the time of adhesion.

Since traditional polyimide is generally poor in the light-transmittance and, in addition, has a tinge of brown, it has been unsatisfactory for use as the adhesives having a good transparency.

Therefore the object of this invention is to provide a novel polyimide adhesive having the high light-transmittance, good transparency, outstanding high-temperature flowability and excellent processability in addition to the ability of keeping adhesive strength during and after use at high temperatures.

SUMMARY OF THE INVENTION

The inventors have investigated earnestly to achieve the above-mentioned object and completed the present invention.

That is, one of the present invention is a high-temperature adhesive which comprises polyimide having recurring units of the formula (I):

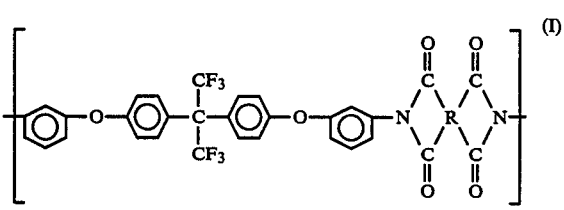

(where R is a tetra-valent radical selected from the group consisting of aliphatic radical having not less than two carbons, cycloaliphatic radical, monoaromatic radical, condensed polyaromatic radical, and non condensed polyaromatic radical wherein aromatic radicals are mutually connected with a bond or a crosslinking function).

And another invention is a method for adhesion which comprises applying polyimide having recurrent units of the formula (I):

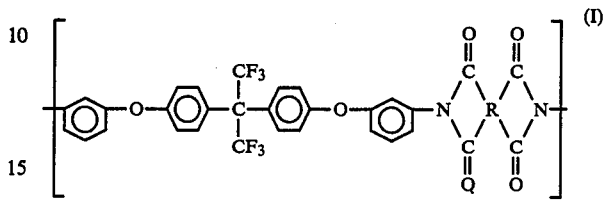

(where R is the same as above) on a substrate, overlapping the applied surface of the substrate with the surface of another substrate and heating under pressure above the glass transition temperature of said polyimide.

DETAILED DESCRIPTION OF THE INVENTION

Figure 1:
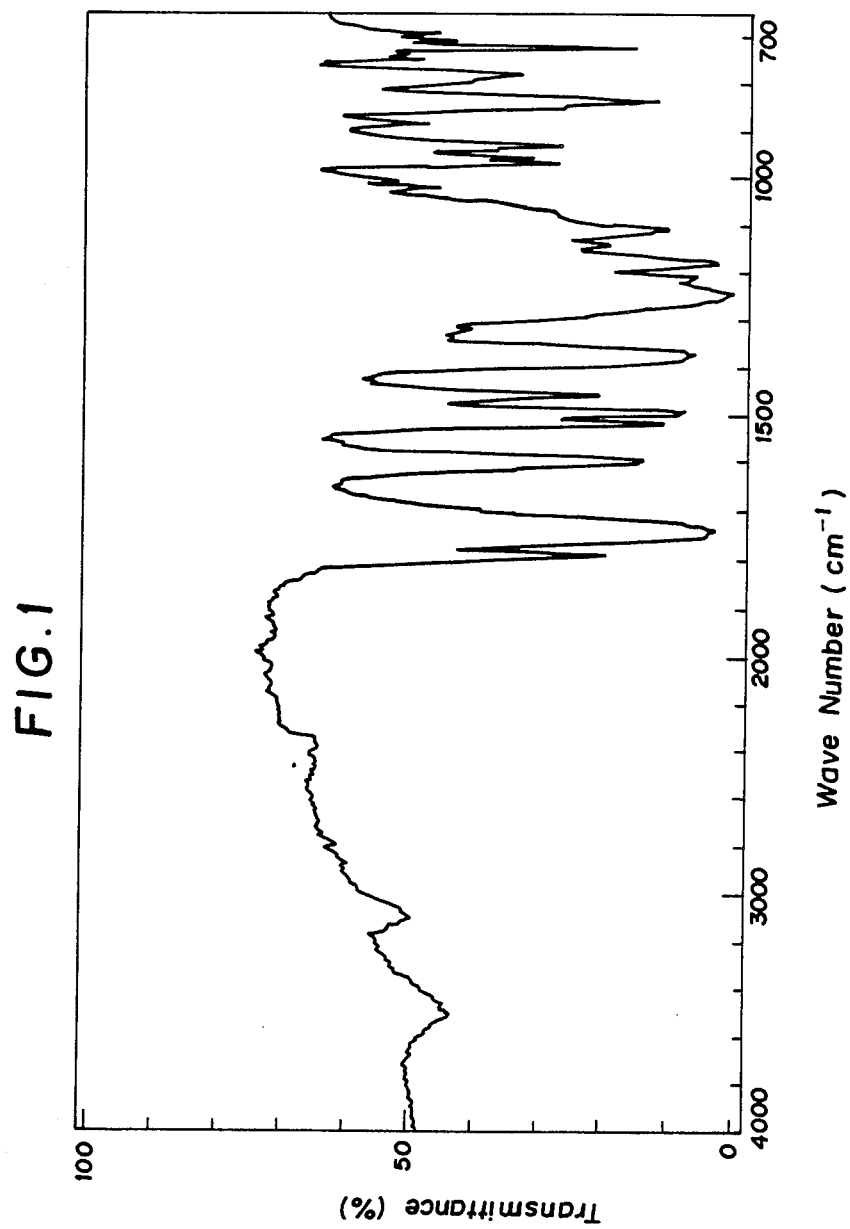
FIG. 1 illustrates an IR absorption spectrum atlas on an example of polyimide for use in the practice of this invention.

Polyimide of the present invention has the above-described formula (I) and is prepared by the following method.

That is, 2,2-bis[4-(3-aminophenoxy)phenyl]-1,1,1,3,3,3-hexafluoropropane, an ether diamine having the formula (II):

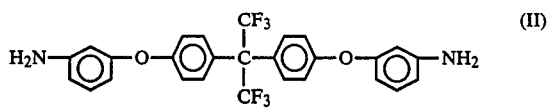

is reacted as a diamine component with one or more of tetracarboxylic dianhydride and resultant polyamic acid having recurring units of the following formula (III):

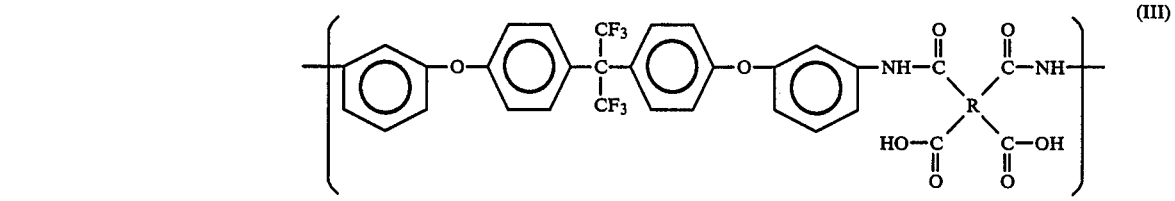

(where R is the same as above) is further conducted the ring-closing reaction by dehydration to give ployimide.

Polyimide of this invention has an improvement in using 2,2-bis[4-(3-aminophenoxy)phenyl]-1,1,1,3,3,3-hexafluoropropane as the diamine component. It has been quite unknown to use polyimide for the adhesives which is derived from the ether-diamine having ether-linkages and aromatic amino radicals in the same molecule as described above.

In the afore-said TOKKAISHO 58-157190(1983), it is disclosed that polyimide prepared from 2,2-bis[4-(4-aminophenoxy)phenyl]-1,1,1,3,3,3-hexafluoropropane and pyromellitic dianhydride may be used as adhesives. Polyimide derived from this diamine, however, has a high glass transition temperature of above 300° C. Therefore, the adhesives prepared from this polyimide are very poor in processability, and hence cause many troubles and defects in bonding operations and properties of bonded articles.

Besides in TOKKAISHO 59-76451(1984), polyimide is disclosed which is derived from diamine having the above formula (II) and pyromellitic dianhydride. This literature, however, describes no suggestion at all concerning the use of said polyimide for adhesives.

Polyimide of this invention can afford adhesives having excellent transparency, good flowability at high temperatures and outstanding processabitliy in addition to substantial characteristics of high-temperature stability.

Polyimide used in the present invention can be normally prepared by reacting 2,2-bis[4-(3-aminophenoxy)-phenyl]-1,1,1,3,3,3-hexafluoropropane with tetracarboxylic dianhydride in organic solvents.

Tetracarboxylic dianhydride for use in the method of this invention has the formula (IV):

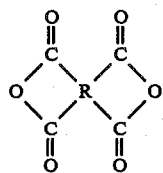

(where R is a tetra-valent radical selected from the group consisting of aliphatic radical having not less than two carbons, cycloaliphatic radical, monoaromatic radical, condensed polyaromatic radical, and non condensed polyaromatic radical wherein aromatic radicals are mutually connected with a bond or a crosslinking function).

Tetracarboxylic dianhydride used in the method includes, for example, ethylene tetracarboxylic dianhydride, cyclopentane tetracarboxylic dianhydride, pyromellitic dianhydride, 3,3',4,4'-benzophenone tetracarboxylic dianhydride, 2,2',3,3'-benzophenonetetracarboxylic dianhydride, 3,3',4,4'-biphenyltetracarboxylic dianhydride, 2,2',3,3'-biphenyltetracarboxylic dianhydride, 2,2-bis(3,4-dicarboxyphenyl)propane dianhydride, 2,2-bis(2,3-dicarboxyphenyl(propane dianhydride, bis(3,4-dicarboxyphenyl)ether dianhydride, bis(3,4-dicarboxyphenyl)sulfone dianhydride, 1,1-bis-(2,3-dicarboxyphenyl)ethane dianhydride, bis(2,3-dicarboxyphenyl)methane dianhydride, bis(3,4-dicarboxyphenyl)methane dianhydride, 2,3,6,7-naphthalenetetracarboxylic dianhydride, 1,4,5,8-naphthalenetetracarboxylic dianhydride, 1,2,5,6-naphthalenetetracarboxylic dianhydride, 1,2,3,4-benzenetetracarboxylic dianhydride, 3,4,9,10-perylenetetracarboxylic dianhydride, 2,3,6,7-anthracenetetracarboxylic dianhydride and 1,2,7,8-phenanthrenetetracarboxylic dianhydride. Tetracarboxylic dianhydride can be used alone or in mixtures of two or more.

Preferred in particular among these dianhydrides are pyromellitic dianhydride, 3,3',4,4'-biphenyltetracarboxylic dianhydride and bis(3,4-dicarboxyphenyl)ether dianhydride. Polyimide obtained from these dianhydrides has extraordinarily excellent transparency and good high-temperature flowability.

3,3',4,4'-benzophenoneteracarboxylic dianhydride is also a preferable dianhydride which can produce polyimide having prominent flowability in high temperatures.

The organic solvents used in the reaction include, for example, N,N-dimethylformamide, N,N-dimethylacetamide, N,N-diethylacetamide, N,N-dimethylmethoxyacetamide, N-methyl-2-pyrrolidone, 1,3-dimethyl-2-imidazolidinone, N-methylcaprolactam, 1,2-dimethoxyethane, bis(2-methoxyethyl)ether, 1,2-bis(2-methoxyethoxy)ethane, bis[2-(2-methoxyethoxy)ethyl]ether, tetrahydrofuran, 1,3-dioxane, 1,4-dioxane, pyridine, picoline, dimethylsulfoxide, dimethyl sulfone, tetramethylurea, hexamethylphosphoramide, m-creaol, p-chlorophenol and anisole. These solvents can be used alone or in mixtures of two or more.

The reaction temperature is normally 200° C. or less, preferably 50° C. or less. The reaction pressure is not restricted in particular and atmospheric pressure is sufficient for carrying out the reaction. The reaction time depends upon the type of solvents, reaction temperature, and tetracarboxylic dianhydrides, and is normally enough to complete the formation of polyamic acid. Reaction for 4 to 24 hours is normally sufficient.

Such reaction affords polyamic acid having recurring units of the following formula (I):

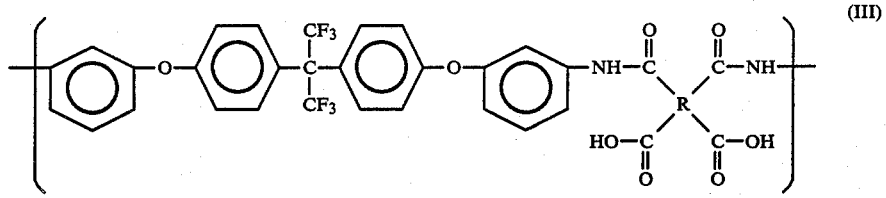

(where R is the same as above).

In the next step, thermal dehydration of the polyamic acid solution at 100° to 300° C. or chemical dehydration by treating with imidizing agent such as acetic anhydride afford the corresponding polyimide having recurring units of the formula (I):

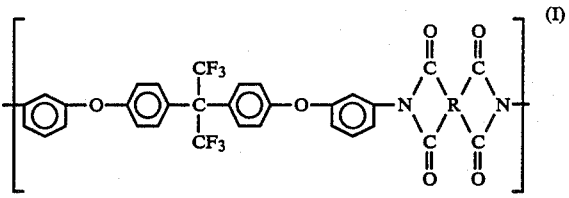

The method of applying the polyimide of this invention for adhesive is roughly divided into two procedures.
(1) The polyamic acid precursor dissolved in organic solvent is used as adhesive solution, and imidized before adhesion.
(2) The ployimide is used in the form as it is.

In the procedure (1), the adhesive solution is an organic solvents solution of polyamic acid. It may be the resultant reaction mixture of polyamic acid obtained by reacting 2,2-bis[4-(3-aminophenoxy)phenyl]-1,1,1,3,3,3-hexafluoropropane with tetracarboxylic dianhydride in the organic solvents. It also may be the solution containing polyamic acid as the main component and polyimide which is a cyclized product of polyamic acid. Thus the adhesive solution containing polyamic acid may be the solution or suspension containing polyimide as an auxiliary ingredient.

When applying the solution containing such polyamic acid, a thin layer of polyamic acid solution is formed on the substrate to be bonded, followed by preheating the coated substrate in air for a desired period at 180° to 350° C. preferably about 220° C. Excess solvents are removed and the polyamic acid is converted to polyimide on the substrate. The coated substrate is overlapped with another substrate and then strongly bonded by pressing under pressure of 1–1,000 kg/cm$^2$ at temperature of 50°–400° C., followed by curing at temperature of 100°–400° C.

In the procedure (2), above described polyimide is a film previously prepared by thermal dehydration or chemical dehydration with a dehydrating agent such as acetic anhydride. The polyimide is also the powder substantially consisting of polyimide as it is. In these cases, some of said polyamic acid may be contained in said polyimide.

To apply the polyimide films or the powder for adhesion, these are inserted between the substrates and pressed under pressure of 1–1,000 kg/cm$^2$ at temperature of 50°–400° C. The adherends can be strongly bonded by curing at temperature of 100°–400° C.

EXAMPLES

The present invention will be illustrated with respect to following Synthetic example, Examples and Comparative example.

Synthetic example 2,2-Bis[4-(3-aminophenoxy)phenyl]-1,1,1,3,3,3-hexafluoropropane for use in this invention was prepared by the following process.

A 200 ml glass reaction vessel was charged with 20 grams (0.059 mol) of 2,2-bis(4-hydroxyphenyl)-1,1,1,3,3,3-hexafluoropropane, 24 grams (0.14 mol) of m-dinitrobenzene, 19.4 grams of potassium carbonate and 100 ml of N,N-dimethylformamide. The mixture was reacted for 7 hours at 140° to 150° C. After ending the reaction, the resultant reaction mixture was cooled and poured into 1000 ml of water. Crude 2,2-bis[4-(3-nitrophenoxy)phenyl]-1,1,1,3,3,3-hexafluoropropane was separated as tarry material. The tarry material was dissolved in benzene and washed with water. The benzene layer was dried with magnesium sulfate and column-chromatographed over silica gel. Purified 2,2-bis[4-(3-nitrophenoxy)phenyl]-1,1,1,3,3,3-hexafluoropropane obtained as yellow oil was 28.3 grams (83% yield).

In the next step, a 300 ml glass reaction vessel was charged with 20 grams (0.035 mol) of 2,2-bis[4-(3-nitrophenoxy)phenyl]-1,1,1,3,3,3-hexafluoropopane, 2 grams of active carbon, 0.2 gram of ferric chloride hexahydrate and 100 ml of isopropyl alcohol. The mixture was stirred under reflux for 30 minutes and then 7 grams (0.14 mol) of hydrazine hydrate was added dropwise over 2 hours at 60° to 70° C., followed by further stirring for 5 hours under reflux. The resultant reaction mixture was cooled, filtered to remove the catalyst and 60 ml of isopropyl alcohol was distilled off from the filtrate. The residue was added with 80 grams of 17.5% hydrochloric acid, followed by further adding 10 grams of sodium chloride and cooled to 20° to 25° C. with stirring. The precipitated crystals were filtered, recrystallized again by using 40 ml of isopropyl alcohol and 80 grams of 17.5% hydrochloric acid. The filtered crystals were dissolved in 50% isopropyl alcohol and neutralized with aqueous ammonia.

The separated crystals were filtered, washed with water, dried and recrystallized from a solvent mixture of benzene and n-hexane. 2,2-Bis[4-(3-aminophenoxy)phenyl]-1,1,1,3,3,3-hexafluoropropane thus obtained was 13.6 grams (75% yield) and was colorless crystals having a melting point of 137° to 139° C. and purity of 99.2% according to high speed liquid chromatography.

Elementary analysis ($C_{27}H_{20}N_2F_6O_2$):

|  | C | H | N | F |
|---|---|---|---|---|
| Calculated (%) | 62.55 | 3.86 | 5.41 | 22.00 |
| Found (%) | 69.86 | 5.20 | 5.20 | 21.95 |

IR(KBr, cm$^{-1}$): 3480 and 3380 (amino group), 1240 (ether linkage).

EXAMPLE 1

A reaction vessel equipped with a stirrer, reflux condenser and nitrogen inlet tube was charged with 10.36 grams (0.02 mol) of 2,2-bis[4(3-aminophenoxy)phenyl]-1,1,1,3,3,3-hexafluoropropane and 44.16 grams of N,N-dimethylacetmide, and added with 4.273 grams (0.0196 mol) of pyromellitic dianhydride in portions at room temperature under nitrogen atmosphere with care not to raise the solution temperature above 30° C. The reaction mixture was further stirred for 20 hours at room temperature.

Polyamic acid thus obtained had an inherent viscosity of 0.55 dl/g at 35° C. in 0.5% N,N-dimethylacetamide solution.

After diluting the polyamic acid solution by adding 88.3 grams of N,N-dimethylacetamide and stirring for 30 minutes, 8.08 grams (0.08 mol) of triethylamine and 12.24 grams (0.12 mol) of acetic anhydride were dropwise added and stirring was further continued at room temperature under nitrogen atmosphere.

Light yellow polyimide powder was started to precipitate at about 7 hours after the addition, and the stirring was further continued for 20 hours.

The separated polyimide powder was filtered, washed with methanol, and dried at 180° C. for 24 hours under reduced pressure.

The polyimide powder thus obtained was 13.68 grams (97% yield) and had crystallinity of 28.2% according to X-ray analysis.

FIG. 1 illustrates the IR absorption spectrum atlas of polyimide thus obtained. In the spectrum atlas, remarkable absorption is found at 1780 cm$^{-1}$ and 1720 cm$^{-1}$ which are charactereistic absorption bands of imide ring and 1240 cm$^{-1}$ which is characteristic absorption band of either linkage.

The powder had a glass transition temperature of 231° C., melting point of 387° C. in accordance with DSC method and 5% weight decrease temperature in air of 528° C. in accordance with DTA-TG.

The polyimide powder obtained by the practice of this example had a melt viscosity of $9.9 \times 10^3$ poises at 420° C. measured with a Japan High Polymer Society type flow tester (CFT-500, from Shimadzu Seisakusho) by use of an orifice having a diameter of 0.1 cm under 300 kg load. The strand obtained was light brown, transparent and had a high flexibility.

The polyimide powder was inserted between cold rolled steel panels (JIS 3141, spec/SD, $25 \times 100 \times 1.6$ mm) which were preheated at 130° C. and pressed for five minutes at 340° C. with pressure of 20 kg/cm$^2$.

The bonded specimen had a lap shear strength of 285 kg/cm$^2$ at room temperature and 195 kg/cm$^2$ at 200° C. in accordance with JIS K-6848 and K-6850.

EXAMPLE 2

A reaction vessel equipped with a stirrer, reflux condenser and nitrogen inlet tube was charged with 5.18 grams (0.01 mol) of 2,2-bis[4-(3-aminophenoxy)phenyl]-1,1,1,3,3,3-hexafluoropropane and 22.1 grams of N,N-dimethylacetamide, and added with 2.18 grams (0.01 mol) of pyromellitic dianhydride in portions at room temperature under nitrogen atmosphere with care not to raise the solution temperature above 30° C. The reaction mixture was further stirred for 20 hours at room temperature.

Polyamic acid thus obtained had an inherent viscosity of 2.1 dl/g.

The polyamic acid solution was applied on a cold rolled steel panel which was previously washed with trichloroethylene and dried for one hour each at 100° C. and 220° C. The coated panel was overlapped with another cold rolled steel panel and pressed for five minutes at 340° C. with pressure of 20 kg/cm$^2$.

The bonded specimen thus obtained had a lap shear strength of 280 kg/cm$^2$ at room temperature and 204 kg/cm$^2$ at 200° C.

A part of the polyamic acid solution was casted on a glass plate and heated for one hour each at 100° C., 200° C. and 300° C.

The polyimide film thus obtained had a thickness of about 50 microns, a glass transition temperature of 248° C. in accordance with TMA penetration method and 5% weight decrease temperature in air of 526° C. in accordance with DTA-TG.

The polyimide film also had tensile strength of 12.0 kg/mm$^2$ an elongation of 10% in accordance with ASTM D-882.

Furthermore, the polyimide film had light-transmittance of 85% and haze of 0.65% in accordance with ASTM D-1003.

The polyimide film was inserted between cold rolled steel panels which were preheated at 130° C. and pressed for five minutes at 340° C. with pressure of 20 kg/cm$^2$. The bonded specimen had a lap shear strength of 290 kg/cm$^2$ at room temperature and 200 kg/cm$^2$ at 200° C.

EXAMPLE 3

A reaction vessel equipped with a stirrer, a reflux condenser and a nitrogen inlet tube was charged with 10.36 grams (0.02 mol) of 2,2-bis[4-(3-aminophenoxy)-phenyl]-1,1,1,3,3,3-hexafluoropropane, 4.273 grams (0.0196 mol) of pyromellitic dianhydride and 133.8 grams of m-cresol and heated to raise its temperature with stirring under nitrogen atmosphere. A light orange, transparent and homogeneous solution was obtained at about 60° C. The solution was heated up to 150° C. and further stirred for an hour. Light yellow polyimide powder started to precipitate slowly. The mixture was further heated for 5 hours with stirring and filtered. The resulting polyimide powder was washed with methanol and acetone and dried for 24 hours at 180° C. under reduced pressure to give 13.03 grams (92.3% yield) of polyimide powder. The polyimide powder thus obtained had the same IR absorption spectrum as shown in FIG. 1. X ray analysis of the polyimide powder indicated crystallinity of 44.7%. The polyimide powder was absolutely insoluble in aliphatic halogenated hydrocarbon solvents such as methylene chloride, chlorsform and the like.

The polyimide powder had a glass transition temperature of 232° C., a melting point of 388° C. and 5% weight decrease temperature of 530° C.

The polyimide powder also had a melt viscosity of $7.3 \times 10^3$ poises. The strand obtained was light brown, transparent and highly flexible.

COMPARATIVE EXAMPLE 1

The same polymerization procedure as described in Example 2 was repeated except 2,2-bis[4-(4-aminophenoxy)phenyl]-1,1,1,3,3,3-hexafluoropropane was used in place of 2,2-bis[4-(3-aminophenoxy)phenyl]-1,1,1,3,3,3-hexafluoropropane. Polyamic acid thus obtained had an inherent viscosity of 1.25 dl/g.

The polyamic acid solution was further imidized chemically by the same procedure as described in Example 1. The polyimide powder thus obtained was failed in measuring melt viscosity because the powder was infusible and no strand was obtained.

Besides a part of the polyamic acid solution was casted on a glass plate and heated an hour each at 100° C., 200° C. and 300° C. to obtain a polyimide film. The glass transition temperature of the polyimide film was high and indicated 310° C.

EXAMPLE 4

A reaction vessel equipped with a stirrer, reflux condenser and nitrogen inlet tube was charged with 5.18 grams (0.01 mol) of 2,2-bis[4-(3-aminophenoxy)phenyl]-1,1,1,3,3,3-hexafluoropropane and 25.2 grams of N,N-dimethylacetamide, and added with 3.188 grams (0.0099 mol) of 3,3',4,4'-benzophenonetetracarboxylic dianhydride in portions at room temperature under nitrogen atmosphere with care not to raise the solution temperature above 30° C. The reaction mixture was further stirred for 20 hours at room temperature.

Polyamic acid thus obtained had an inherent viscosity of 1.1 dl/g.

A part of the polyamic acid solution was casted on a glass plate and heated for one hour each at 100° C., 200° C. and 300° C.

The light yellow and transparent polyimide film thus obtained had a glass transition temperature of 206° C. and 5% weight decrease temperature in air of 531° C.

The polyimide film also had tensile strength of 13.1 kg/mm$^2$ and elongation of 7%.

The polyimide film was inserted between cold rolled steel panels which were preheated at 130° C. and pressed for five minutes at 340° C. with pressure of 20 kg/cm$^2$. The bonded specimen had a lap shear strength of 349 kg/cm$^2$ at room temperature and 210 kg/cm$^2$ at 150° C.

EXAMPLE 5

A reaction vessel equipped with a stirrer, reflux condenser and nitrogen inlet tube was charged with 10.36 grams (0.02 mol) of 2,2-bis[4-(3-aminophenoxy)phenyl]-1,1,1,3,3,3-hexafluoropropane and 147.3 grams of N,N-dimethylacetamide, and added with 6.01 grams (0.0194 mol) of bis(3,4-dicarboxyphenyl)ether dianhydride in portions at room temperature under nitrogen atmosphere with care not to raise the solution temperature above 30° C. The reaction mixture was further stirred for 20 hours at room temperature.

Polyamic acid thus obtained had an inherent viscosity of 0.62 dl/g.

To the polyamic acid solution 8.08 grams (0.08 mol) of triethylamine and 12.24 grams (0.12 mol) of acetic anhydride were dropwise added and stirring was further continued at room temperature under nitrogen atmosphere.

Light yellow polyimide powder was started to precipitate at about 10 hours after the addition, and the stirring was further continued for 20 hours.

The separated polyimide powder was filtered, washed with methanol, and dried at 180° C. for 24 hours under reduced pressure.

The polyimide powder thus obtained was 14.87 grams (95% yield) and had melt viscosity of $3.2 \times 10^3$ poises.

The powder was inserted between cold rolled steel panels which were preheated at 130° C. and pressed at 340° C. for 5 minutes with pressure of 20 kg/cm². The bonded specimen had a lap shear strength of 355 kg/cm² at room temperature and 200 kg/cm² at 150° C.

EXAMPLE 6

A reaction vessel equipped with a stirrer, reflux condenser and nitrogen inlet tube was charged with 5.18 grams (0.01 mol) of 2,2-bis[4-(3-aminophenoxy)phenyl]-1,1,1,3,3,3-hexafluoropropane and 24.6 grams of N,N-dimethylacetamide, and added with 3.01 grams (0.0097 mol) of bis(3,4-dicarboxyphenyl)ether dianhydride in portions at room temperature under nitrogen atmosphere with care not to raise the solution temperature above 30° C. The reaction mixture was further stirred for 20 hours at room temperature.

Polyamic acid thus obtained had an inherent viscosity of 0.68 dl/g.

The polyamic acid solution was applied on a cold rolled steel panel which was previously washed with trichloroethylene and dried for one hour each at 100° C. and 220° C. The coated panel was overlapped with another cold rolled steel panel and pressed for five minutes at 340° C. with pressure of 20 kg/cm².

The bonded specimen thus obtained had a lap shear strength of 360 kg/cm² at room temperature.

A part of the polyamic acid solution was casted on a glass plate and heated for one hour each at 100° C., 200° C. and 300° C.

The colorless and transparent polyimide film thus obtained had a thickness of about 50 microns, a glass transition temperature of 191° C. and 5% weight decrease temperature in air of 538° C.

The polyimide film also had tensile strength of 12.5 kg/mm² and elongation of 8%.

Furthermore, the polyimid film had light-transmittance of 89% and haze of 0.52%.

The polyimide film was inserted between cold rolled steel panels which were preheated at 130° C. and pressed for five minutes at 340° C. with pressure of 20 kg/cm². The bonded specimen had a lap shear strength of 362 kg/cm² at room temperature and 220 kg/cm² at 150° C.

EXAMPLE 7

A reaction vessel equipped with a stirrer, reflux condenser and nitrogen inlet tube was charged with 5.18 grams (0.01 mol) of 2,2-bis[4-(3-aminophenoxy)phenyl]-1,1,1,3,3,3-hexafluoropropane and 72.0 grams of N,N-dimethylacetamide, and added with 2.82 grams (0.0096 mol) of 3,3',4,4'-biphenyltetracarboxylic dianhydride in portion at room temperature under nitrogen atmosphere with care not to raise the solution temperature above 30° C. The reaction mixture was further stirred for 20 hours at room temperature.

Polyamic acid thus obtained had an inherent viscosity of 0.52 dl/g.

To the polyamic acid solution 8.08 grams (0.08 mol) of triethylamine and 12.24 grams (0.12 mol) of acetic anhydride were dropwise added and stirring was further continued at room temperature under nitrogen atmosphere.

Light yellow polyimide powder was started to precipitate at about 9 hours after the addition, and the stirring was further continued for 20 hours.

The separated polyimide powder was filtered, washed with methanol, and dried at 180° C. for 24 hours under reduced pressure.

The polyimide powder thus obtained was 6.99 grams (96% yield) and had melt viscosity of $5.5 \times 10^3$ poises.

The powder was inserted between cold rolled steel panels which were preheated at 130° C. and pressed at 340° C. for 5 minutes with pressure of 20 kg/cm². The bonded specimen had a lap shear strength of 350 kg/cm² at room temperature and 218 kg/cm² at 150° C.

EXAMPLE 8

A reaction vessel equipped with a stirrer, reflux condenser and nitrogen inlet tube was charged with 5.18 grams (0.01 mol) of 2,2-bis[4-(3-aminophenoxy)phenyl]-1,1,1,3,3,3-hexafluoropropane and 24.3 grams of N,N-dimethylacetamide, and added with 2.91 grams (0.0099 mol) of 3,3',4,4'-biphenyltetracarboxylic dianhydride in portions at room temperature under nitrogen atmosphere with care not to raise the solution temperature above 30° C. The reaction mixture was further stirred for 20 hours at room temperature.

Polyamic acid thus obtained had an inherent viscosity of 1.0 dl/g.

The polyamic acid solution was applied on a cold rolled steel panel which was previously washed with trichloroethylene and dried for one hour each at 100° C. and 220° C. The coated panel was overlapped with another cold rolled steel panel and pressed for five minutes at 340° C. with pressure of 20 kg/cm²

The bonded specimen thus obtained had a lap shear strength of 350 kg/cm² at room temperature and 218 kg/cm² at 150° C.

A part of the polyamic acid solution was casted on a glass plate and heated for one hour each at 100° C., 200° C. and 300° C.

The polyimide film thus obtained had a thickness of about 50 microns, a glass transition temperature of 220° C. and 5% weight decrease temperature in air of 538° C.

The polyimide film also had tensile strength of 13.2 kg/mm² and elongation of 36%.

Furthermore, the polyimide film had light-transmittance of 85% and haze of 0.6%.

The polyimide film was inserted between cold rolled steel panels which were preheated at 130° C. and pressed for five minutes at 340° C. with pressure of 20 kg/cm$^2$. The bonded specimen had a lap shear strength of 355 kg/cm$^2$ at room temperature and 220 kg/cm$^2$ at 150° C.

What we claim is:

1. A high-temperature resistance adhesive consisting of polyimide, which consists of recurring units of the formula:

[structure showing polyimide repeating unit with $CF_3$ groups and R tetravalent aromatic radical]

where R is a tetra-valent aromatic radical selected from the group consisting of:

[structures of benzene, biphenyl, and diphenyl ether tetravalent radicals] and

2. The high-temperature resistant adhesive as claimed in claim 1 wherein R is:

[benzophenone tetravalent structure]

3. The high-temperature resistant adhesive as claimed in claim 1 wherein R is:

[benzene tetravalent structure]

4. The high-temperature resistant adhesive as claimed in claim 1 wherein R is:

[biphenyl tetravalent structure]

5. The high-temperature resistant adhesive as claimed in claim 1 wherein R is:

[diphenyl ether tetravalent structure]

[benzophenone tetravalent structure]

* * * * *